United States Patent
Pu

(10) Patent No.: US 9,178,718 B2
(45) Date of Patent: Nov. 3, 2015

(54) METHOD AND MOBILE TERMINAL FOR DEALING WITH PS DOMAIN SERVICE AND REALIZING PS DOMAIN SERVICE REQUEST

(75) Inventor: Huan Pu, Beijing (CN)

(73) Assignee: ST-ERICSSON SEMICONDUCTOR (BEIJING) CO., LTD, Beijing (CN)

( * ) Notice: Subject to any disclaimer, the term of this patent is extended or adjusted under 35 U.S.C. 154(b) by 198 days.

(21) Appl. No.: 13/990,518

(22) PCT Filed: Dec. 2, 2011

(86) PCT No.: PCT/CN2011/083346
§ 371 (c)(1),
(2), (4) Date: Jul. 8, 2013

(87) PCT Pub. No.: WO2012/075906
PCT Pub. Date: Jun. 14, 2012

(65) Prior Publication Data
US 2013/0286950 A1 Oct. 31, 2013

(30) Foreign Application Priority Data
Dec. 6, 2010 (CN) .......................... 2010 1 0582270

(51) Int. Cl.
*H04W 4/00* (2009.01)
*H04L 12/54* (2013.01)
*H04W 48/18* (2009.01)
*H04W 8/18* (2009.01)

(52) U.S. Cl.
CPC ............... *H04L 12/56* (2013.01); *H04W 48/18* (2013.01); *H04W 8/18* (2013.01)

(58) Field of Classification Search
CPC ......... H04L 12/56; H04L 12/54; H04W 8/02; H04W 8/18; H04W 8/22; H04W 28/0226; H04W 36/00; H04W 36/0011; H04W 48/18; H04W 48/20; H04W 88/06; H04W 88/00
See application file for complete search history.

(56) References Cited

U.S. PATENT DOCUMENTS

| 2005/0254469 | A1* | 11/2005 | Verma et al. .................. 370/338 |
| 2008/0096607 | A1* | 4/2008 | Lee ............................... 455/558 |
| 2009/0318116 | A1* | 12/2009 | Kim ............................... 455/411 |

FOREIGN PATENT DOCUMENTS

| CN | 1756405 A | 4/2006 |
| CN | 1832618 A | 9/2006 |

(Continued)

OTHER PUBLICATIONS

International Search Report issued in corresponding International application No. PCT/CN2011/083346, mailing date Mar. 15, 2012.

*Primary Examiner* — Anh Ngoc Nguyen
(74) *Attorney, Agent, or Firm* — Patent Portfolio Builders PLLC

(57) ABSTRACT

The present invention provides a method for dealing with a PS domain service and realizing a PS domain service request for a mobile terminal and the mobile terminal. The method comprises: identifying, by the mobile terminal, a type of a PS domain signaling process that is used for realizing a PS domain service; when the type of the PS domain signaling process belongs to a first type, acquiring a result of the PS domain signaling process corresponding to the PS domain signaling process; and when it is judged that the result is network refusal and the reason for refusal is Reason #7 (GPRS service not allowed), judging that a Public Land Mobile Network (PLMN) on which the mobile terminal currently resides is not a Home Public Land Mobile Network (HPLMN) and adding the PLMN into a list of forbidden PLMNs for GPRS service. According to the above technical solution, it is able to provide a GPRS service on a HPLMN or other PLMNs, thereby to provide a user with a PS domain service with the biggest possibility.

10 Claims, 5 Drawing Sheets

(56) References Cited

FOREIGN PATENT DOCUMENTS

| CN | 101060701 A | 10/2007 |
| CN | 101877904 A | 11/2010 |
| CN | 102025627 A | 4/2011 |

* cited by examiner

METHOD AND MOBILE TERMINAL FOR DEALING WITH PS DOMAIN SERVICE AND REALIZING PS DOMAIN SERVICE REQUEST

TECHNICAL FIELD

The present invention relates to the field of mobile communication technology, in particular to a method and a mobile terminal for dealing with a PS domain service and realizing a PS domain service request.

BACKGROUND

International Mobile Telecom System-2000 (IMT-2000), as an advanced mobile communication system, can enable a mobile terminal to transmit, in any way, information to anyone with a high quality at anytime and anywhere on a global scale. Each mobile terminal can support various types of services simultaneously. For example, the mobile terminal can receive voice calls when it is connected to a local area network, i.e., it can perform voice communication and data reception/transmission simultaneously. In a communication system, a Core Net (CN) is a basic platform capable of providing a user with all communication services including switching of calls and routing of packet data. Therefore, logically, the CN includes Circuit Switched (CS) domain and Packet Switched (PS) domain. The function of each domain is realized by several sets of basic processes, and each of which consists of several sub-processes for achieving a set of special functions respectively. The basic process for the CS domain mainly supports CS domain services, including the sub-processes such as normal location update, periodical location update, International Mobile Subscriber Identity (IMSI) attachment/detachment, Temporary Mobile Subscriber Identity (TMSI) reallocation, authentication, encryption and identification. The basic process for PS domain mainly supports PS domain services, including the sub-processes such as General Packet Radio Service (GPRS) attachment/detachment, combined routing update, normal routing update, periodical routing update, Packet Temperate Mobile Subscription Identity (P-TMSI) reallocation, GPRS authentication and encryption. The basic processes include common processes and special processes. The common processes are initiated after signaling connection has been established, while the special processes are initiated when there exists no signaling connection and the network will judge whether or not to accept such special processes.

The inventor finds that there exists in the prior art the following problem. After the mobile terminal initiates the basic process, if the basic process is refused by the network for Reason #7 (GPRS services not allowed), the mobile terminal will set the GPRS status as GU3 Roaming Not Allowed, and delete status flag bits such as P-TMSI, P-TSMI signature, RAI and GPRS Ciphering Key Sequence Number (CKSN) in accordance with a corresponding protocol of 3GPP, e.g., TS24.0008. Moreover, before shutting down the mobile terminal or replacing a SIM card, the network is impossible to provide the SIM card with GPRS services. As a result, this will get a user of the mobile terminal into trouble in use.

SUMMARY

An object of the present invention is to provide a method and a mobile terminal for dealing with a PS domain service and realizing a PS domain service request, so as to solve the problem in the prior art that, after a basic process initiated by the mobile terminal is refused by a network for Reason #7 (GPRS services not allowed) and before the mobile terminal is shut down or a SIM card is replaced, a user of the mobile terminal will be in trouble since the network is impossible to provide the SIM card with GPRS services.

In order to solve the above-mentioned problem, the present invention provides a method for dealing with a PS domain service and realizing a PS domain service request for a mobile terminal, comprising: identifying, by the mobile terminal, a type of a PS domain signaling process that is used for realizing a PS domain service; when the type of the PS domain signaling process belongs to a first type, acquiring a result of the PS domain signaling process corresponding to the PS domain signaling process; and when it is judged that the result is network refusal and the reason for refusal is Reason #7 (GPRS service not allowed), judging that a Public Land Mobile Network (PLMN) on which the mobile terminal currently resides is not a Home Public Land Mobile Network (HPLMN) and adding the PLMN into a list of forbidden PLMNs for GPRS service.

Subsequent to adding the PLMN into the list of forbidden PLMNs for GPRS service, the method further comprises: searching, by the mobile terminal, the PLMNs during the network selection and residing, as a priority, in a cell of the PLMN among the searched PLMNs that is not present in the list of forbidden PLMNS for GPRS service.

Subsequent to judging that the result of the PS domain signaling process is network refusal and the reason for refusal is Reason #7, the method further comprises setting, by the mobile terminal, a GPRS status flag bit of the PS domain signaling process.

In the method, the setting comprises, setting the GPRS service status as Roaming Not Allowed, and deleting P-TMSI, P-TMSI signature, RAI and GPRS CKSN.

In the method, if a triggering condition for network selection by the mobile terminal is that a user requests for a GPRS service, the PLMN where, after the successful network selection, a cell in which the mobile terminal resides is located is not present in the list of forbidden PLMNs for GPRS service, and a GPRS service status is GU1 UPDATED, the mobile terminal will initiate the GPRS service to the network.

In the method, if the triggering condition for the network selection by the mobile terminal is manual network selection or loss of coverage, the mobile terminal resides in a new-found cell after the successful network selection.

The first type includes: GPRS detachment initiated by the network to the mobile terminal; combined or uncombined GPRS attachment or detachment initiated by the mobile terminal; combined routing update, normal routing update, or periodical routing update.

The present invention further provides a mobile terminal, comprising: an identifying unit configured to identify a type of a PS domain signaling process that is used for realizing a PS domain service; a signaling analyzing unit configured to, when the type of the PS domain signaling process belongs to a first type, acquire a result of the PS domain signaling process; a flag bit setting unit configured to, when it is judged that the result of the PS domain signaling process is network refusal and the reason for refusal is Reason #7 (GPRS service not allowed), set a GPRS status flag bit of the PS domain signaling process; and a managing unit for list of forbidden PLMNs for GPRS service configured to, when it is further judged that a PLMN on which the mobile terminal currently resides is not a HPLMN, add the PLMN into a list of forbidden PLMNs for GPRS service.

The first type includes: GPRS detachment initiated by the network to the mobile terminal; combined or uncombined GPRS attachment or detachment initiated by the mobile terminal; combined routing update, normal routing update, or periodical routing update.

The mobile terminal further comprises a searching unit configured to search the PLMNs and reside, as a priority, in a cell of the PLMN among the searched PLMNs that is not present in the list of forbidden PLMNs for GPRS service.

The above technical solutions of the present invention achieve the following beneficial effects. In the mobile terminal, if the result of the PS domain signaling process shows that the PS domain signaling process has been refused by the network for Reason #7 (GPRS service not allowed), it means that the mobile terminal may also be refused even if it tries again to acquire the network service. At this time, the non-HPLMN on which the mobile terminal currently resides is added into the list of forbidden PLMNs for GPRS service, so as to deny an attempt to acquire the network services again by the mobile terminal on the non-HPLMN on which the mobile terminal currently resides, and to trigger an attempt to acquire again the network services by the mobile terminal on the other non-HPLMNs or the HPLMNs on which the mobile terminal may reside, so as to improve the success rate of the PS domain services. As a result, in the case of not shutting down the mobile terminal or replacing the SIM card, it is able to deal with whether or not the network can provide the SIM card with the GPRS services again in accordance with the different types of the PLMNs on which the mobile terminal currently resides.

DETAILED DESCRIPTION

In order to make the technical problems, the technical solutions and the advantages of the present invention more apparent, the present invention will be described hereinafter in details in conjunction with the drawings and the embodiments.

In the embodiments, after a basic process initiated by a mobile terminal is refused by a network and the reason for refusal is Reason #7 (GPRS services not allowed), in the case of not shutting down the mobile terminal or replacing a SIM card, it is able to deal with whether or not the network can provide the SIM card with a GPRS service again in accordance with different types of PLMNs on which the mobile terminal currently resides.

As for a specific mobile terminal, it is usually necessary to maintain several types of PLMN lists, each of which includes a plurality of PLMNs. The present invention mainly relates to the following PLMN lists:

(1) HPLMN: a PLMN to which an end user belongs; and
(2) VPLMN (Visited PLMN): a PLMN to which the end user accesses.

The PLMN is totally different from MCC and MNC of IMSI stored in the SIM card. When the coverage of the mobile terminal is lost, a VPLMN will be selected.

In IMT-2000, the function of each domain is realized by several sets of basic processes, each of which consists of several sub-processes for achieving a set of special functions respectively. The basic process for PS domain mainly supports PS domain services, including the sub-processes such as (1) combined/uncombined GPRS attachment/detachment, (2) combined routing update, (3) normal routing update and periodical routing update, (4) P-TMSI reallocation, and (5) GPRS authentication and encryption. The basic processes include common processes and special processes. The common processes are initiated after signaling connection has been established, while the special processes are initiated when there exists no signaling connection and the network will judge whether or not to accept such special processes. The special processes for PS domain include:

(1) GPRS detachment initiated by a network;

(2) combined/uncombined GPRS attachment/detachment initiated by a mobile terminal;

(3) combined routing update, or normal and periodical routing update; and (4) PS domain service request. The above processes may be found in TS24.008.

If the special processes (1), (2) and (3) are refused by the network, such a refusal may be caused by Reason #7 (GPRS services not allowed).

Figure 1:
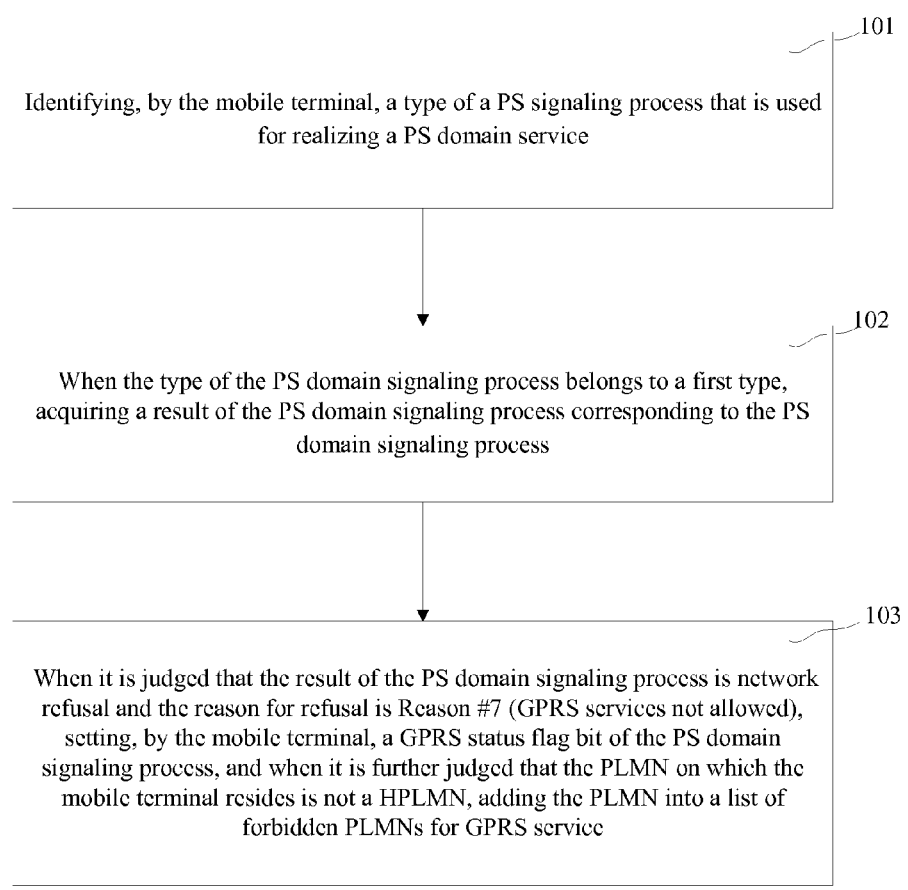
FIG. 1 is a flow chart of a method for dealing with a PS domain service in accordance with embodiments of the present invention.

The present invention provides a method for dealing with a PS domain service for a mobile terminal. As shown in FIG. 1, the method comprises the steps of:

Step 101: identifying, by the mobile terminal, a type of a PS signaling process that is used for realizing a PS domain service;

Step 102: when the type of the PS domain signaling process belongs to a first type, acquiring a result of the PS domain signaling process corresponding to the PS domain signaling process; and Step 103: when it is judged that the result of the PS domain signaling process is network refusal and the reason for refusal is Reason #7 (GPRS services not allowed), setting, by the mobile terminal, a GPRS status flag bit of the PS domain signaling process, and when it is further judged that the PLMN on which the mobile terminal resides is not a HPLMN, adding the PLMN into a list of forbidden PLMNs for GPRS service.

Through the above technical solution, if the result of the PS domain signaling process shows that the PS domain signaling process has been refused by the network for Reason #7 (GPRS service not allowed), it means that the mobile terminal may also be refused even if it tries again to acquire the network service. At this time, the non-HPLMN on which the mobile terminal currently resides is added into the list of forbidden PLMNs for GPRS service, so as to deny an attempt to acquire the network services again by the mobile terminal on the non-HPLMN on which the mobile terminal currently resides, and to trigger an attempt to acquire again the network services by the mobile terminal on the other non-HPLMNs or the HPLMNs on which the mobile terminal may reside, thereby to improve the success rate of the PS domain services. As a result, in the case of not shutting down the mobile terminal or replacing the SIM card, it is able to deal with whether or not the network can provide the SIM card with the GPRS services again in accordance with the different types of the PLMNs on which the mobile terminal currently resides.

The first type of the PS domain signaling process includes the former special processes, i.e., (1) GPRS detachment initiated by the network, (2) combined/uncombined GPRS attachment/detachment initiated by the mobile terminal, and (3) combined routing update/normal and periodical routing update.

In Step 103, the step of, when it is judged that the result of the PS domain signaling process is network refusal and the reason for refusal is Reason #7 (GPRS services not allowed), setting, by the mobile terminal, a GPRS status flag bit of the PS domain signaling process comprises:

setting the GPRS service status as Roaming Not Allowed, and deleting P-TMSI, P-TMSI signature, RAI and GPRS CKSN(Ciphering Key Sequence Number).

In Step 103, if the PLMN on which the mobile terminal currently resides is a HPLMN, the network will no longer provide the mobile terminal with the GPRS service before the mobile terminal is shut down and then restarted or a SIM card is replaced.

Figure 2:
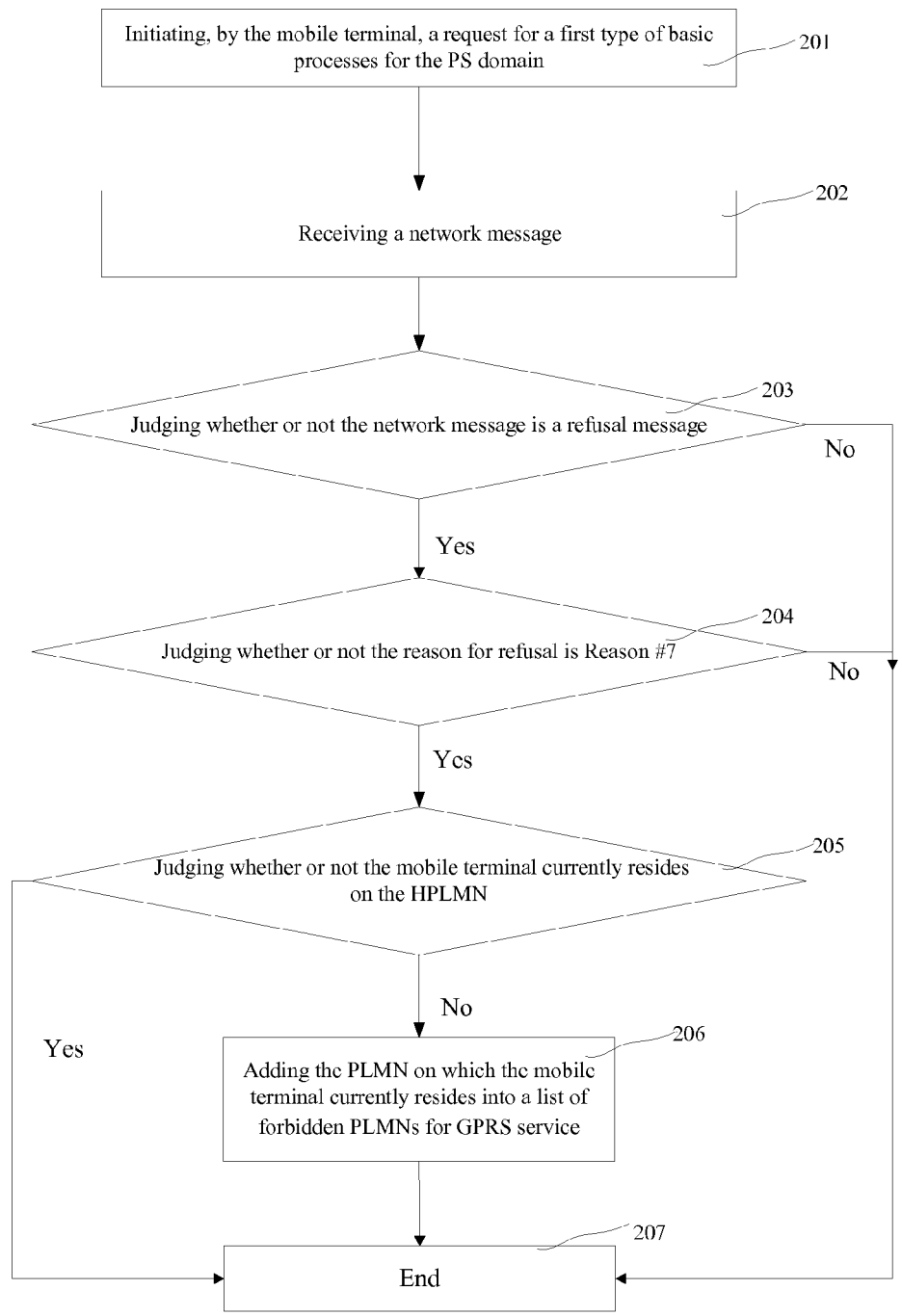
FIG. 2 is a schematic view showing an application scenario of the method for dealing with a PS domain service in accordance with embodiments of the present invention.

To be specific, as shown in FIG. 2, the method comprises the following steps:

Step 201: initiating, by the mobile terminal, a request for a first type of basic processes for the PS domain;

Step 202: receiving, by the mobile terminal, a network message;

Step 203: judging whether or not the network message is a refusal message, if yes, proceeding to Step 204, and otherwise proceeding to Step 207;

Step 204: judging whether or not the reason for refusal is Reason #7, if yes, proceeding to Step 205, and otherwise proceeding to Step 207;

Step 205: judging whether or not the mobile terminal currently resides on the HPLMN, if yes, proceeding to Step 207, and otherwise proceeding to Step 206;

Step 206: adding the PLMN on which the mobile terminal currently resides into a list of forbidden PLMNs for GPRS service; and Step 207: terminating the procedure.

Figure 3:
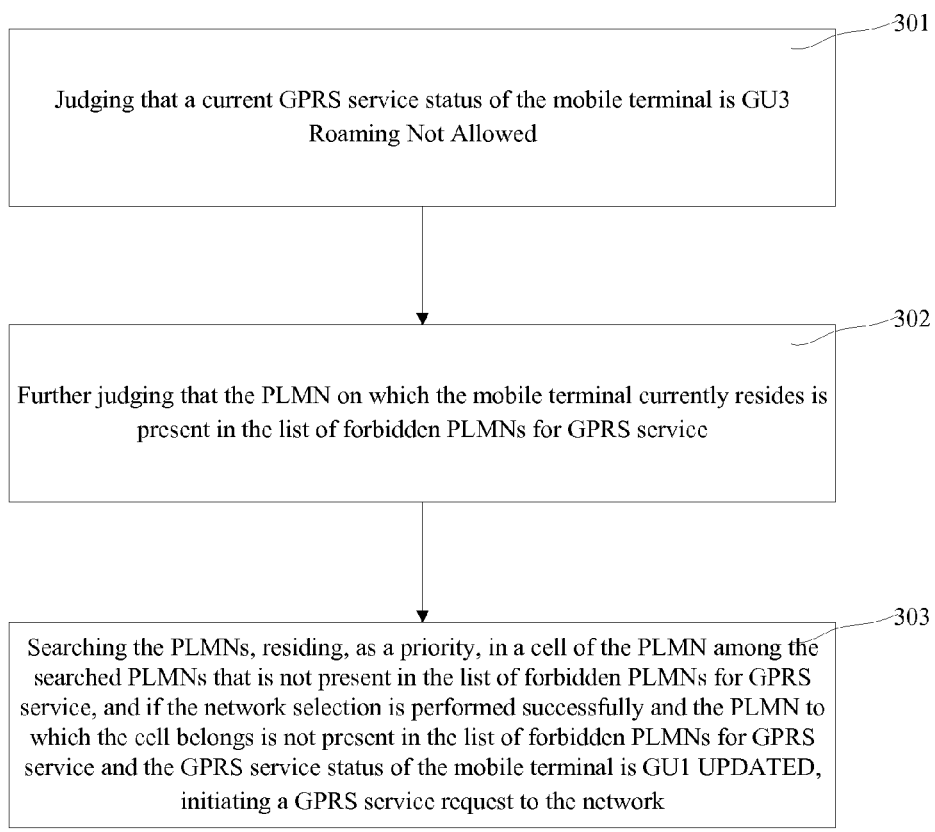
FIG. 3 is a flow chart of a method for initiating a PS domain service request in accordance with embodiments of the present invention.

The present invention further provides a method for dealing with a PS domain service request for a mobile terminal, which, as shown in FIG. 3, comprises the steps of:

Step 301: judging that a current GPRS service status of the mobile terminal is GU3 Roaming Not Allowed;

Step 302: further judging that the PLMN on which the mobile terminal currently resides is present in the list of forbidden PLMNs for GPRS service; and Step 303: searching the PLMNs, residing, as a priority, in a cell of the PLMN among the searched PLMNs that is not present in the list of forbidden PLMNs for GPRS service, and if the network selection is performed successfully and the PLMN to which the cell belongs is not present in the list of forbidden PLMNs for GPRS service and the GPRS service status of the mobile terminal is GU1 UPDATED, initiating a GPRS service request to the network.

Figure 4:
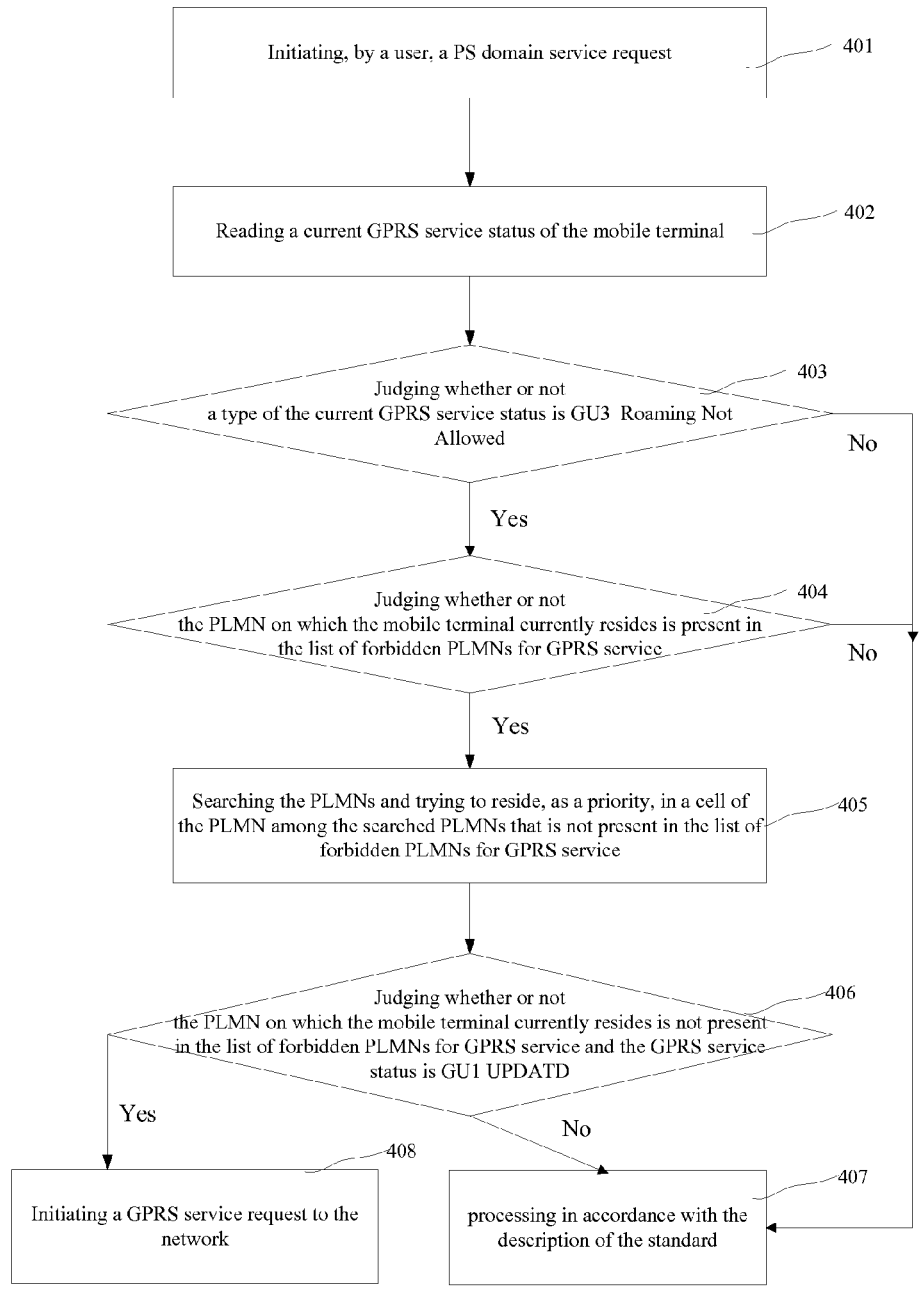
FIG. 4 is a schematic view showing an application scenario of the method for initiating a PS domain service request in accordance with embodiments of the present invention.

In order to make the technical solution more apparent, the method for dealing with a PS domain service request is described hereinafter in conjunction with an application scenario, and as shown in FIG. 4, the method comprises the steps of:

Step 401: initiating, by a user, a PS domain service request;

Step 402: reading a current GPRS service status of the mobile terminal;

Step 403: judging whether or not a type of the current GPRS service status is GU3 Roaming Not Allowed, if yes, proceeding to Step 404, and otherwise proceeding to Step 407;

Step 404: judging whether or not the PLMN on which the mobile terminal currently resides is present in the list of forbidden PLMNs for GPRS service, if yes, proceeding to Step 405, and otherwise proceeding to Step 407;

Step 405: searching the PLMNs and trying to reside, as a priority, in a cell of the PLMN among the searched PLMNs that is not present in the list of forbidden PLMNs for GPRS service;

Step 406: judging whether or not the PLMN on which the mobile terminal currently resides is not present in the list of forbidden PLMNs for GPRS service and the GPRS service status GU1 UPDATED, if yes, proceeding to Step 408, and otherwise proceeding to Step 407;

Step 407: processing in accordance with the description of the standard; and Step 408: initiating a GPRS service request to the network.

Without loss of generality, the mobile terminal may be of an A type during the application of the technical solution provided herein.

When the mobile terminal resides on a VPLMN A of a cell and is desired to perform routing area update, it will judge whether or not the reason for refusal is Reason #7 if the result of the PS domain signaling process received by the mobile terminal is network refusal. If yes, the mobile terminal will judge whether or not it resides on a HPLMN, and if not, the mobile terminal will add the VPLMN A into a list of forbidden PLMNs for GPRS services. Then, if the mobile terminal resides in a new cell after manual network selection, or resides in a new cell such as VPLMN B/HPLMN after the loss of coverage, the user is permitted to use the GPRS services in the new cell.

When the mobile terminal resides on the other PLMNs without manual network selection or due to loss of coverage, the mobile terminal will automatically select the PLMNs and reside, as a priority, on the PLMN that is not present in the list of forbidden PLMNs for GPRS service if the user requests for a PS domain service. If the mobile terminal resides successfully on the PLMN that is not present in the list of forbidden PLMNs for GPRS service and the GPRS service status of the mobile terminal is GU1 UPDATED, the mobile terminal will initiate a GPRS service request to the network.

If the mobile terminal is not refused on the HPLMN for Reason #7, the GPRS service is merely not provided on the current PLMN, and the current PLMN is added into the list of forbidden PLMNs for GPRS service. Then, if the mobile terminal resides again on the other PLMN, the GPRS service may be still provided on the other PLMN.

The technical solution provided in the above application scenario conforms to the provision that the HPLMN cannot be added into the list of forbidden PLMNs for GPRS service, and the GPRS service may also be provided on the HPLMN or the other PLMNs. As a result, it is able to provide the user with the PS domain service with the biggest possibility.

The mobile terminal is a data card. When the data card resides on a VPLMN A and is desired to perform routing area update, it is refused by the network for Reason #7. After receiving the network refusal, the data card judges whether or not the reason for refusal is Reason #7. If yes, it judges whether or not it currently resides on the HPLMN, and if not, it adds the VPLMN A to the list of forbidden PLMNs for GPRS service. Then, if the data card resides in a new cell through manual network selection, or resides in a new cell such as VPLMN B/HPLMN after the loss of coverage, the user is permitted to use the GPRS service.

When the data card resides on the other PLMN without manual network selection or due to loss of coverage, the data card will automatically select the PLMNs and reside, as a priority, on the PLMN that is not present in the list of forbidden PLMNs for GPRS services if the user requests for a PS domain service. If the data card resides successfully on the PLMN that is not present in the list of forbidden PLMNs for GPRS service and the GPRS service status of the data card is GU1 UPDATED, the data card will initiate a GPRS service request to the network.

Figure 5:
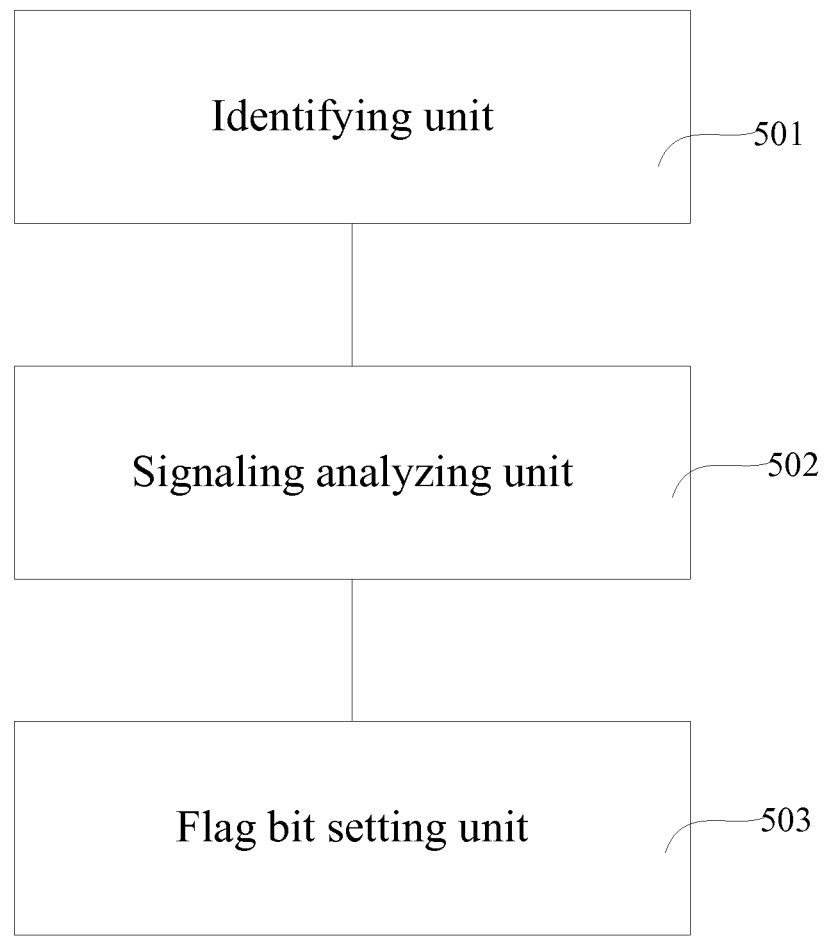
FIG. 5 is a structural schematic view showing a mobile terminal in accordance with embodiments of the present invention.

Correspondingly, the present invention provides a mobile terminal which, as shown in FIG. 5, comprises:

an identifying unit 501, configured to identify a type of a PS domain signaling process that is used for realizing a PS domain service;

a signaling analyzing unit 502, configured to acquire a result of the PS domain signaling process when the type of the PS domain signaling process belongs to a first type;

a flag bit setting unit 503, configured to, when it is judged that the result of the PS domain signaling process is network refusal and the reason for refusal is Reason #7 (GPRS services not allowed), set a GPRS status flag bit of the PS domain signaling process; and a managing unit for list of forbidden PLMNs for GPRS service 504, configured to, when it is further judged that a PLMN on which the mobile terminal currently resides is not a HPLMN, add the PLMN into a list of forbidden PLMNs for GPRS service.

During the PS domain signaling process, the first type includes:

GPRS detachment initiated by the network to the mobile terminal;

combined or uncombined GPRS attachment or detachment initiated by the mobile terminal; and combined routing update, and normal and periodical routing update.

The mobile terminal further comprises:

a searching unit, configured to search the PLMNs and reside, as a priority, the PLMN among the searched PLMNs that is not present in the list of forbidden PLMNs for GPRS service.

Through the above technical solution, in the mobile terminal, if the result of the PS domain signaling process shows that the PS domain signaling process has been refused by the network for Reason #7 (GPRS service not allowed), it means that the mobile terminal may also be refused even if it tries again to acquire the network service. At this time, the non-HPLMN on which the mobile terminal currently resides is added into the list of forbidden PLMNs for GPRS service, so as to deny an attempt to acquire the network services again by the mobile terminal on the non-HPLMN on which the mobile terminal currently resides, and to trigger an attempt to acquire again the network services by the mobile terminal on the other non-HPLMNs or the HPLMNs on which the mobile terminal may reside, thereby to improve the success rate of the PS domain services. As a result, in the case of not shutting down the mobile terminal or replacing the SIM card, it is able to deal with whether or not the network can provide the SIM card with the GPRS services again in accordance with the different types of the PLMNs on which the mobile terminal currently resides.

The above are the preferred embodiments of the present invention. It should be appreciated that, a person skilled in the art can make improvements and modifications without departing from the spirit of the present invention. These improvements and modifications shall also be considered as the scope of the present invention.

What is claimed is:

1. A method for dealing with a Packet Switched (PS) domain service and realizing a PS domain service request for a mobile terminal, comprising:
   identifying, by the mobile terminal, a type of a PS domain signaling process that is used for realizing the PS domain service;
   when the type of the PS domain signaling process belongs to a first type, acquiring a result of the PS domain signaling process corresponding to the PS domain signaling process; and
   when it is judged that the result is network refusal and the reason for refusal is Reason #7 (General Packet Radio Service (GPRS) service not allowed), judging that a Public Land Mobile Network (PLMN) on which the mobile terminal currently resides is not a Home Public Land Mobile Network (HPLMN) and adding the PLMN into a list of forbidden PLMNs for GPRS service.

2. The method according to claim 1, wherein, subsequent to adding the PLMN into the list of forbidden PLMNs for GPRS service, the method further comprises:
   searching, by the mobile terminal, the PLMNs during the network selection and residing, as a priority, in a cell of the PLMN among the searched PLMNs that is not present in the list of forbidden PLMNS for GPRS service.

3. The method according to claim 1, wherein, subsequent to judging that the result of the PS domain signaling process is network refusal and the reason for refusal is Reason #7, the method further comprises:
   setting, by the mobile terminal, a GPRS status flag bit of the PS domain signaling process.

4. The method according to claim 3, wherein the setting comprises:
   setting the GPRS service status as Roaming Not Allowed, and deleting Packet Temperate Mobile Subscription Identity (P-TMSI), P-TMSI signature, Routing Area Identifier (RAI) and GPRS Ciphering Key Sequence Number (CKSN).

5. The method according to claim 2, wherein
   if a triggering condition for network selection by the mobile terminal is that a user requests for a GPRS service, the PLMN where, after the successful network selection, a cell in which the mobile terminal resides is located is not present in the list of forbidden PLMNs for GPRS service, and a GPRS service status is GU1 UPDATED, the mobile terminal initiates the GPRS service to the network.

6. The method according to claim 5, wherein if the triggering condition for the network selection by the mobile terminal is manual network selection or loss of coverage, the mobile terminal resides in a new-found cell after the successful network selection.

7. The method according to claim 1, wherein the first type includes:
   GPRS detachment initiated by the network to the mobile terminal;
   combined or uncombined GPRS attachment or detachment initiated by the mobile terminal;
   combined routing update, normal routing update, or periodical routing update.

8. A mobile terminal, comprising:
   an identifying unit, configured to identify a type of a Packet Switched (PS) domain signaling process that is used for realizing a PS domain service;
   a signaling analyzing unit, configured to, when the type of the PS domain signaling process belongs to a first type, acquire a result of the PS domain signaling process;
   a flag bit setting unit, configured to, when it is judged that the result of the PS domain signaling process is network refusal and the reason for refusal is Reason #7 (General Packed Radio Service (GPRS) service not allowed), set a GPRS status flag bit of the PS domain signaling process; and a managing unit for list of forbidden Public Land Mobile Networks (PLMNs) for GPRS service, configured to, when it is further judged that a PLMN on which the mobile terminal currently resides is not a Home Public Land Mobile Network (HPLMN), add the PLMN into a list of forbidden PLMNs for GPRS service.

9. The mobile terminal according to claim 8, wherein the first type includes:

GPRS detachment initiated by the network to the mobile terminal;

combined or uncombined GPRS attachment or detachment initiated by the mobile terminal;

combined routing update, normal routing update, or periodical routing update.

10. The mobile terminal according to claim 8, further comprising:

a searching unit, configured to search the PLMNs and reside, as a priority, in a cell of the PLMN among the searched PLMNs that is not present in the list of forbidden PLMNs for GPRS service.

* * * * *